United States Patent [19]

Solc

[11] Patent Number: 4,677,142

[45] Date of Patent: Jun. 30, 1987

[54] COMPOSITE PIGMENTING PARTICLES AS THERMOSTABILIZERS OF PLASTIC MATERIALS

[75] Inventor: Jitka Solc, Midland, Mich.

[73] Assignee: The Dow Chemical Company, Midland, Mich.

[21] Appl. No.: 849,345

[22] Filed: Apr. 7, 1986

Related U.S. Application Data

[63] Continuation of Ser. No. 660,685, Oct. 15, 1984, abandoned.

[51] Int. Cl.$^4$ ............... C08K 3/26; C08K 3/22; C08J 3/22
[52] U.S. Cl. ............... 523/206; 523/351; 524/425; 524/430; 524/431; 524/505
[58] Field of Search ............... 523/204, 206, 210, 218, 523/221, 351; 525/95, 98; 524/505, 780, 787, 788, 791, 431, 425, 430

[56] References Cited

U.S. PATENT DOCUMENTS

| | | | |
|---|---|---|---|
| 3,459,830 | 8/1969 | Legge et al. | 525/98 |
| 3,562,356 | 2/1971 | Nyberg et al. | 525/98 |
| 3,641,205 | 2/1972 | Flair et al. | 525/98 |
| 3,985,702 | 10/1976 | Himes | 525/98 |
| 4,397,988 | 8/1983 | Sherman | 525/98 |
| 4,421,660 | 12/1983 | Solc | 523/202 |
| 4,433,073 | 2/1984 | Sano et al. | 523/206 |

FOREIGN PATENT DOCUMENTS 48-18567  6/1973  Japan .

*Primary Examiner*—Veronica P. Hoke

[57] ABSTRACT

Thermoplastic elastomer compositions such as those block polymers containing nonelastomeric polymer blocks and elastomeric polymer blocks exhibit improved stability upon thermal stress due to the addition thereof colloidal size particles of an inorganic solid (e.g., $Al_2O_3$) which are dispersed in a hydrophobic polymer matrix (e.g., a copolymer of styrene and n-butylacrylate). Such thermoplastic elastomer compositions are useful in applications where articles which are prepared from the thermoplastic elastomers are exposed to repeated thermal stresses.

11 Claims, No Drawings

COMPOSITE PIGMENTING PARTICLES AS THERMOSTABILIZERS OF PLASTIC MATERIALS

CROSS-REFERENCE TO RELATED APPLICATION

This is a continuation of application Ser. No. 660,685 filed Oct. 15, 1984, now abandoned.

BACKGROUND OF THE INVENTION

This invention relates to colloidal size particulates containing particles of an inorganic material and to thermoplastic elastomers containing such particulates.

Metals, metal oxides, pigments, fillers and other inorganic particulates that tend to agglomerate are often coated with or encapsulated in hydrophobic polymers. Methods for preparing colloidal size hydrophobic polymers particulate having discrete particles of an inorganic material dispersed therein are disclosed in U.S. Pat. No. 4,421,660, which is incorporated herein by reference.

Thermoplastic elastomers are typically ABA or AB(BA)$_n$ block polymers in which the A block is a thermoplastic material while the B block is an elastomeric material, and n has a value of 0 or greater. See, for example, U.S. Pat. Nos. 3,265,765 and 4,427,837. Because of the thermodynamic incompatibility of the A and B blocks, separate phases of thermoplastic material and elastomeric material form in which the thermoplastic component is dispersed in the elastomeric phase. Such a material exhibits a reversible network structure or domains in which an elastomer exhibits a high tensile strength. Unfortunately, considerable loss of tensile strength of the thermoplastic elastomers occurs when said thermoplastic elastomers are subjected to repeated heat treatment.

In view of the deficiencies of the prior art it would be highly desirable to provide an effective and efficient means for providing thermal stability (as for example, a nonyellowing characteristic) to thermoplastic elastomer materials which stability does not undergo significant degradation over time or over repeated thermal stress.

SUMMARY OF THE INVENTION

The present invention is a thermoplastic elastomer composition which exhibits improved stability upon thermal str(R)ss which comprises (1) a block polymer containing nonelastomeric polymer blocks and elastomeric polymer blocks and (2) a stabilizing amount of colloidal inorganic solid particles such that substantially all of the inorganic particles are maintained in a discrete spaced apart relationship to each other by a hydrophobic polymer, which polymer is a hydrophobic polymer matrix in which the inorganic solid particles are dispersed.

In another aspect, the present invention is a process for improving the tensile strength of thermally stressed thermoplastic elastomer compositions, said process comprising intimately contacting a block polymer containing nonelastomeric polymer blocks and elastomeric polymer blocks with a stabilizing amount of colloidal inorganic solid particle such that substantially all of the inorganic particles are maintained in a discrete spaced apart relationship to each other by a hydrophobic polymer; which polymer is a hydrophobic polymer matrix in which the inorganic solid particles are dispersed.

The present invention allows the skilled artisan to prepare thermoplastic elastomer compositions containing essentially non-extractable thermostabilizers. Not only do the compositions of this invention exhibit good thermal stability (as for example, a nonyellowing characteristic) but such compositions exhibit improved long term stability upon exposure to repeated thermal stresses. Thus, it is possible for the skilled artisan to prepare articles of manufacture from said compositions, which articles can be recycled using reusable thermoplastic elastomers. That is compositions of this invention can be heated and reheated without losing their desirable elastomeric properties. The thermostabilizers do not significantly affect the desirable properties of the thermoplastic elastomer compositions.

DETAILED DESCRIPTION OF THE INVENTION

Colloidal inorganic solid particles contain, for example, those inorganic solids described in U.S. Pat. No. 4,421,660, which is incorporated herein by reference in its entirety. Suitable inorganic solids, and hydrophobic monomers and polymers are also disclosed therein, as well as methods for preparation of the compositions wherein the colloidal inorganic solid particles are maintained in a discrete spaced apart relationship. Generally, the colloidal inorganic solid particles have diameters less than 0.6 micrometers, preferably between 0.005 and 0.4 micrometers. For purposes of this invention, hydrophobic polymers having a "soft" character (i.e., exhibiting a glass transition temperature ($T_g$) of about 25° C. or less) are preferred. Hydrophobic polymers can be crosslinked if desired. For example, the hydrophobic polymer can be crosslinked with a polyvinyl crosslinking monomer. Preferably, the hydrophobic polymer is a polymer comprising polymerized monovinylidene aromatic monomer (e.g., styrene), an alkyl ester of an unsaturated carboxylic acid (e.g., n-butylacrylate or 2-ethylhexylacrylate), or a combination thereof. Preferably, the thermostabilizer comprises from about 1 to about 70 weight percent of inorganic solid particles and from about 30 to about 99 weight percent of hydrophobic matrix polymer. For purposes of this invention, colloidal inorganic solid particles having substantially all of the inorganic particles in a discrete spaced apart relationship to each other by a hydrophobic polymer are referred to as "thermostabilizers".

Thermoplastic elastomer compositions as well as elastomeric and thermoplastic materials are disclosed in U.S. Pat. Nos. 4,427,837; 4,362,849; 4,169,115; 3,281,383; 4,431,777 and 3,265,765; which are incorporated herein by reference. In addition, other thermoplastic materials such as polypropylene can be employed.

The thermostabilizers are incorporated into the thermoplastic elastomer composition using techniques similar to those known in the art for adding stabilizing additives to thermoplastic elastomer compositions. Typically, this involves blending a functionally effective amount of colloidal inorganic solid particles which are in the polymer matrix, and optionally other additives, with the thermoplastic elastomer composition. For example, the components can be dry blended in a high speed mixer at an elevated temperature using a device such as a Brabender mixer. Drying of the latex can be performed by subjecting the latex dispersion to conditions such as heat in order that the essentially dry powder is obtained, freeze drying the dispersion under vacuum, spray drying, and the like. If desired, the latex dispersion wherein the latex particles contain colloidal inorganic solid particles can be blended with a thermoplastic elastomer composition, and the dispersing liquid is subsequently removed.

The thermostabilizer is incorporated into the thermoplastic elastomer composition in a functionally effective amount (i.e., a stabilizing amount). That is, the amount of thermostabilizer which is employed can vary depending upon the amount of thermal stability which is desired and the amount of tensile strength which is desired. The amount of thermostabilizer which is employed typically ranges from about 0.1 to about 20, preferably from about 1 to about 10, most preferably from about 1 to about 6, weight percent of colloidal inorganic solid particles based on the total weight of the thermoplastic elastomer and thermostabilizer (i.e., the total weight of the composition).

If desired, the thermoplastic elastomer compositions of this invention can be blended with other thermoplastics such as polyolefins (e.g., styrene containing polymers, rubber modified styrene containing polymers, polyvinylchloride, polyethylene, polypropylene, etc.), polycarbonates, polyesters, and the like. In addition, thermoplastic elastomer compositions of this invention can have incorporated therein various other stabilizers such as those known in the art. Such blending can occur either before, during or after the time that the colloidal inorganic solid particles are blended with the thermoplastic elastomer.

Compositions of this invention are usefully employed in a wide variety of applications. Such compositions are particularly useful in those applications where thermoplastic elastomers have been used. The compositions can be fabricated using such techniques as are used for fabricating thermoplastic elastomers. Such techniques include solvent casting, compression molding, injection molding, extrusion, melt spinning, and the like, in order to provide a wide variety of useful articles including fibers, films, molded and extruded articles, and the like. Compositions of this invention can be compounded with pigments, dyes, fillers, stabilizers, and the like. Examples of articles fabricated from the compositions of this invention include packaging materials for foods, etc.; cans and other containers, gloves, utensiles, etc.; and other applications where a reusable thermoplastic elastomer material would be useful. Compositions of this invention are particularly useful in preparing articles in food industry related applications because the stabilizing colloidal inorganic solids particles which provide stability to the thermoplastic elastomer are much less extractable than commonly used stabilizers such as tris-nonylphenyl phosphite, octadecyl, 3,5-di-tert-butyl-4-hydroxyhydrocinnamate and 2,6-di-tert-butyl-para-cresol.

The following examples are presented to further illustrate but not limit the scope of this invention. All parts and percentages are by weight unless otherwise indicated.

EXAMPLE 1

An aqueous dispersion of aluminum oxide ($Al_2O_3$) is prepared by dispersing $Al_2O_3$ having an average particle size diameter of less than 200 Å in water a potassium salt of a functionalized oligomer surfactant formulation sold by Uniroyal Chemical under the tradename Polywet® KX-4 to provide a dispersion. The mixture is blended for about 4 minutes using an ultrasonic mixing device until a stable dispersion of $Al_2O_3$ in water is obtained. In a like manner is prepared an aqueous dispersion of calcium carbonate ($CaCO_3$).

The dispersion is combined with deionized water, Polywet KX-4 surfactant, monomer mixture, initiator, 1 normal sodium hydroxide solution and chelating agent and charged into a 3-necked reaction flask equipped with a stirrer, condensor, a thermometer and 2 addition funnels. The mixture is stirred under nitrogen atomosphere and heated. When the temperature of the mixture reaches about 40° C., a trickle stream containing deionized water and sodium formaldehyde hydrosulfite is added to the reaction flask. The mixture is further heated with stirring under nitrogen atmosphere to 70° C. At this temperature of 70° C., an aqueous stream of deionized water, Polywet KX-4 surfactant, sodium persulfate initiator and I normal sodium hydroxide solution is added at a rate of 2.5 ml/minute. The addition is complete in about 60 minutes and the mixture is maintained at 70° C. under nitrogen atmosphere for an additional 30 minutes. The resulting latex dispersion is distilled under vacuum to remove unreacted monomers and the pH of the dispersion is measured. Recipes for various latexes are presented in Table I.

The latex dispersion is dried at 50° C. for 3 or 4 days in order to provide an essentially dry powder. The powdered latex is contacted with a thermoplastic elastomer which is believed to be a styrene-butadiene-styrene block polymer and which is sold under the tradename Kraton® 1101 by Shell Chemical. The latex and thermoplastic elastomer is dry blended in a Brabender mixer for 10 minutes at about 170° C. into a Type I bar as per ASTM D-638. For certain samples a stabilizer package consisting of tris-nonylphenyl phosphite and 2,6-di-tert-butyl-para-cresol is added to the thermoplastic elastomer composition. The amount of stabilizer package which is added is 1 percent tris-nonylphenyl phosphite and 0.5 percent 2,6-di-tert-butyl-para-cresol based on the weight of the thermoplastic elastomer. Tensile strength and elongation of various samples are measured according to ASTM D-638. Data concerning various stabilized samples are presented in Table 11.

TABLE I

| Sample No. | Dispersion | | | | Charge | | | | | | |
|---|---|---|---|---|---|---|---|---|---|---|---|
| | Type[1] (g) | $H_2O$ (g) | Surfactant | Percent Solids | Pigment (g) | $H_2O$ (g) | Surfactant (g) | Monomer Type[2] (g) | $Na_2S_2O_8$ (g) | NaOH (g) IN | $VSO$[3] (g) |
| 1 | $Al_2O_3$ (30) | 190 | 13.1 | 39 | 30 | 304.7 | 46.2 | S/BA/DVB (80/20/1.25) | 1.8 | 2.5 | 1 |
| 2 | $Al_2O_3$ (30) | 191 | 12.75 | 40 | 30 | 258 | 45 | S/BA (40/10) | 1.8 | 2.5 | 1 |
| 3 | $Al_2O_3$ (60) | 381 | 27.4 | 37.2 | 30 | 241.8 | 48.4 | S/EHA (40/60) | 3.0 | 3.3 | 1 |
| 4 | $Al_2O_3$ (30) | 197 | 17.0 | 39 | 30 | 260 | 45 | S/BA (50/50) | 1.8 | 2.5 | 1 |
| 5 | $Al_2O_3$ (30) | 191 | 13.1 | 39 | 30 | 252 | 45 | S/BA (50/50) | 1.8 | 2.5 | 1 |
| 6 | $CaCO_3$ (80) | 380 | 32.4 | 37.2 | 30 | 322.7 | 24.2 | S/EHA (40/60) | 3 | 3.3 | 1 |
| 7 | $CaCO_3$ (80) | 380 | 32.4 | 37.2 | 75 | 904 | 60.5 | S/BA (125/125) | 4.45 | 6.3 | 2.5 |

TABLE I-continued

| Sample No. | Trickle Stream | | Aqueous Stream | | | | Recovered Latex | |
|---|---|---|---|---|---|---|---|---|
| | SFH[4] (g) | H$_2$O (g) | Surfactant (g) | H$_2$O (g) | Na$_2$S$_2$O$_8$ | NaOH (g) | Solids (percent) | pH |
| 1 | 1.5 | 70 | 46.2 | 50 | 2.4 | 4.5 | 20 | 6.2 |
| 2 | 1.5 | 50 | 45 | 50 | 2.4 | 4 | 20 | 7.6 |
| 3 | 1.5 | 50 | 48.4 | 97 | 1.8 | 3 | 21 | 6.4 |
| 4 | 1.5 | 50 | 45 | 50 | 2.4 | 3 | 19.8 | 6.1 |
| 5 | 1.5 | 50 | 45 | 50 | 2.4 | 3 | 20 | 6.1 |
| 6 | 0.6 | 50 | 24.2 | 50 | 1.8 | 3 | 18.9 | 7.9 |
| 7 | 1.32 | 50 | 60.5 | 100 | 4.5 | 7.5 | 18.5 | 7.2 |

[1] The Al$_2$O$_3$ sample is sold commercially as Aluminum Oxid C by Degussa, Incorporated. The CaCO$_3$ is sold commercially as Multifex MM by Pfizer, Pigments and Metal Division.
[2] S denotes styrene, BA denotes n-butylacrylate, EHA denotes ethyl hexylacrylate and DVB denotes divinylbenze.
[3] VSO denotes Versenex ® 80 chelating agent which is a product of The Dow Chemical Company and is a 1 percent solution of the pentasodium salt of (carboxymethylimino)-bis(ethylenenitrile)tetraacetic acid.
[4] SFH denotes sodium formaldehyde hydrosulfite.

TABLE II

| Composition Sample | Latex (Sample No.) | Weight Percent of Pigment | | Stabilizer[1] | Tensile[2] | Elongation[3] |
|---|---|---|---|---|---|---|
| | | in Latex | in Blend | | | |
| 8 | 1 | 22 | 5 | NS | 1268 | 450 |
| 9 | 1 | 22 | 12 | NS | 1087 | 188 |
| 10 | 2 | 22.5 | 5 | NS | 2785 | 688 |
| 11 | 2 | 22.5 | 12 | NS | 2292 | 475 |
| 12 | 3 | 22 | 2 | NS | 3240 | 940 |
| 13 | 3 | 22 | 5 | NS | 3600 | 840 |
| 14 | 3 | 22 | 12 | NS | 2420 | 860 |
| 15 | 4 | 22 | 2 | NS | 3416 | 1084 |
| 16 | 4 | 22 | 5 | NS | 4159 | 988 |
| 17 | 4 | 22 | 12 | NS | 2828 | 836 |
| 18 | 5 | 22.5 | 2 | FS | 4554 | 975 |
| 19 | 5 | 22.5 | 5 | FS | 4341 | 912 |
| 20 | 5 | 22.5 | 12 | FS | 2892 | 804 |
| 21 | 6 | 21 | 2 | NS | 3750 | 810 |
| 22 | 6 | 21 | 5 | NS | 3890 | 770 |
| 23 | 6 | 21 | 12 | NS | 2390 | 650 |
| 24 | 7 | 21 | 2 | NS | 2840 | 990 |
| 25 | 7 | 21 | 5 | NS | 3470 | 840 |
| 26 | 7 | 21 | 12 | NS | 1270 | 830 |
| 27 | 8[4] | — | 5 | NS | 2501 | 1076 |
| 28 | 8 | — | 12 | NS | 3877 | 908 |
| 29 | 8 | — | 17.5 | NS | 2208 | 748 |
| C-1* | — | — | — | NS | 1010 | 880 |
| C-2* | — | — | — | FS | 3158 | 1380 |
| C-3* | — | — | 2 | NS | 902 | 204 |
| C-4* | — | — | 5 | NS | 1239 | 592 |
| C-5* | — | — | 12 | NS | 1965 | 713 |
| C-6* | — | — | 5 | FS | 1068 | 1040 |
| C-7* | — | — | 10 | FS | 2736 | 1100 |
| C-8* | — | — | 15 | FS | 1397 | 680 |
| C-9* | — | — | 12 | NS | 1200 | 464 |
| C-10* | — | — | 17.5 | NS | 969 | 276 |

*Not an example of this invention.
C-1 is non-stabilized Kraton ® 1101.
C-2 is Kraton ® 1101 stabilized with stabilizer package.
C-3 through C-5 are samples of Kraton ® 1101 to which varying amounts of Al$_2$O$_3$ are added.
C-6 through C-8 are samples of Kraton ® 1101 to which a nonpigmented 50S/50BA latex is added.
C-9 and C-10 are samples of Kraton ® 1101 to which varying amounts of Fe$_3$O$_4$ are added. See footnote (2) of Table I of U.S. Pat. No. 4,421,660.
[1] NS denotes no additional stabilizer and FS denotes fully stabilized with additional stabilizer package.
[2] Tensile is reported in pounds per square inch.
[3] Elongation is reported in percent.
[4] Sample Nos. 27-29 are Fe$_3$O$_4$ containing latexes (80S/20DBA) are prepared as described in Example 1 of U.S. Pat. No. 4,421,660.

The data in Table II illustrate the high tensile strengths of the samples of the invention.

EXAMPLE 2

The stability of the compositions of this invention to repeated thermal stress is illustrated by measuring tensile strength and elongation properties of various samples which have been prepared using blending techniques as described in Example 1 and various blending times. Data is presented in Table III.

TABLE III

| Sample | Composition Sample | Time (min) | Tensile | Elongation |
|---|---|---|---|---|
| 30 | 15 | 10 | 3416 | 1084 |
| | | 20 | 2544 | 1140 |
| | | 40 | 753 | 516 |
| | | 60 | 714 | 340 |
| 31 | 16 | 10 | 4159 | 988 |
| | | 20 | 3365 | 1068 |
| | | 40 | 1217 | 792 |
| | | 60 | 637 | 440 |
| 32 | 18 | 10 | 4554 | 975 |
| | | 20 | 3781 | 1120 |

TABLE III-continued

| Sample | Composition Sample | Time (min) | Tensile | Elongation |
|---|---|---|---|---|
|  |  | 40 | 1764 | 1232 |
|  |  | 60 | 902 | 1120 |
| 33 | 21 | 10 | 3750 | 810 |
|  |  | 20 | 3007 | 1156 |
|  |  | 40 | 718 | 444 |
|  |  | 60 | 745 | 396 |
| 34 | 22 | 10 | 3890 | 770 |
|  |  | 20 | 3243 | 1008 |
|  |  | 40 | 1226 | 812 |
|  |  | 60 | 853 | 488 |
| C-11* | C-1 | 0 | 5170 | 820 |
|  |  | 10 | 1233 | 1032 |
|  |  | 20 | 505 | 620 |
|  |  | 40 | 406 | 430 |
|  |  | 60 | 371 | 352 |
|  |  | 100 | 5107 | 820 |
| C-12* | C-2 | 10 | 3158 | 1380 |
|  |  | 20 | 929 | 1304 |
|  |  | 40 | 383 | 430 |
|  |  | 60 | 279 | 284 |

*Not an example of this invention.

This data illustrate the superior behavior of the samples of the invention after repeated thermal stress as compared to the samples which do not contain the thermostabilizer of this invention.

What is claimed is:

1. A method for preparing a thermally stable thermoplastic elastomer composition comprising the steps of (1) emulsifying at least one hydrophobic, emulsion polymerizable monomer in an aqueous collodial dispersion of discrete particles of an inorganic solid, said dispersion being maintained with a chemical dispersant and/or surfactant, (2) subjecting the emulsion to emulsion polymerization conditions to form a stable, fluid latex dispersion wherein essentially every particle of the inorganic solid is coated with the hydrophobic polymer resulting from said polymerization such that substantially all of the inorganic particles are maintained in a discrete spaced apart relationship to each other by the hydrophobic polymer, (3) drying the latex dispersion to form a powdered latex, and then (4) blending a thermal stabilizing amount of the powdered latex and a block polymer containing nonelastomeric polymer blocks and elastomeric polymer blocks thereby forming the improved thermoplastic elastomer composition.

2. A method of claim 1 wherein said colloidol inorganic solid particles comprise from about 0.1 to about 20 weight percent of said composition based on the total weight of the thermoplastic elastomer composition.

3. A method of claim 1 wherein said collodial inorganic solid particles have diameters less than about 0.6 micrometers.

4. A method of claim 1 wherein said colloidal inorganic solid particles have diameters which range from about 0.005 to about 0.4 micrometers.

5. A method of claim 1 wherein said colloidal inorganic solid particles are iron oxide, aluminum oxide or calcium carbonate.

6. A method of claim 1 wherein said hydrophobic polymer is a polymer comprising polymerized monovinylidene aromatic monomer, alkyl ester of an unsaturated carboxylic acid, or a combination thereof.

7. A method of claim 1 wherein said hydrophobic polymer is crosslinked.

8. A method of claim 1 wherein said hydrophobic polymer is a polymer comprising polymerized styrene and butyl acrylate.

9. A method of claim 1 wherein said powdered latex comprises from about 1 to about 70 weight percent of inorganic solid particles and from about 30 to about 99 weight percent of hydrophobic matrix polymer.

10. A method of claim 1 wherein said nonelastomeric polymer block comprises a monovinyl aromatic hydrocarbon polymer, and said elastomeric polymer block comprises a conjugated diene polymer.

11. A method for preparing a thermally stable thermoplastic elastomer composition comprising the steps of (1) emulsifying at least one hydrophobic, emulsion polymerizable monomer in an aqueous colloidal dispersion of discrete particles of an inorganic solid, said dispersion being maintained with a chemical dispersant and/or surfactant, (2) subjecting the emulsion to emulsion polymerization conditions to form a stable, fluid latex dispersion wherein essentially every particle of the inorganic solid is coated with the hydrophobic polymer resulting from said polymerization such that substantially all of the inorganic particles are maintained in a discrete spaced apart relationship to each other by the hydrophobic polymer, (3) blending a thermal stabilizing amount of the latex dispersion and a block polymer containing nonelastomeric polymer blocks and elastomeric polymer blocks, and then (4) drying the resulting blend thereby forming the improved thermoplastic elastomer composition.

* * * * *